W. APPLEGATH.

HAT SUPPORTER.

No. 11,336. Reissued May 16, 1893.

Witnesses

Alonzo M. Luther.

Allen Penny.

Inventor

William Applegath.

By Attorney

Frank H. Allen

THE NORRIS PETERS CO., PHOTO-LITHO., WASHINGTON, D. C.

UNITED STATES PATENT OFFICE.

WILLIAM APPLEGATH, OF HAMILTON, CANADA, ASSIGNOR, BY DIRECT AND MESNE ASSIGNMENTS, TO WM. A. AIKEN, OF NORWICH, CONNECTICUT.

HAT-SUPPORTER.

SPECIFICATION forming part of Reissued Letters Patent No. 11,336, dated May 16, 1893.

Original No. 481,156, dated August 23, 1892. Application for reissue filed January 3, 1893. Serial No. 457,292.

*To all whom it may concern:*

Be it known that I, WILLIAM APPLEGATH, a citizen of Canada, residing at Hamilton, in the county of Wentworth, in the Province of Ontario, Canada, have invented a new and useful Device for Suspending Hats, of which the following is a specification.

My invention relates to improvements in a device for suspending men's hats, which consists of a thin circular metallic plate having a flange and one or more indentations for strengthening purposes, in combination with suspending-bands supplied with buckle and clips; and the objects of my improvements are, first to provide a device for suspending men's hats when on view in shop-windows or other suitable places, and, second, to afford facilities for the easy adjustment to any style of hat. I attain these objects by the mechanism illustrated in the accompanying drawings, in which—

Figure 1:
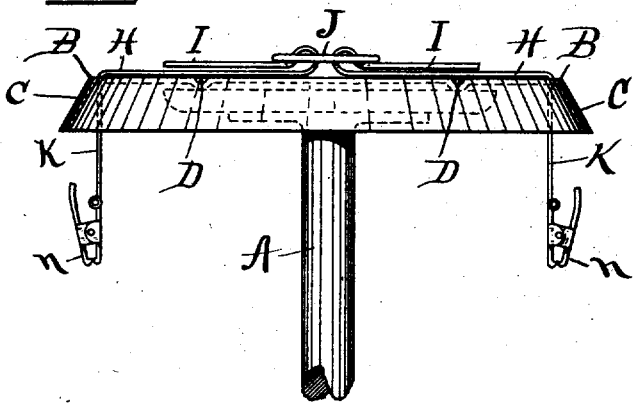
Figure 2:
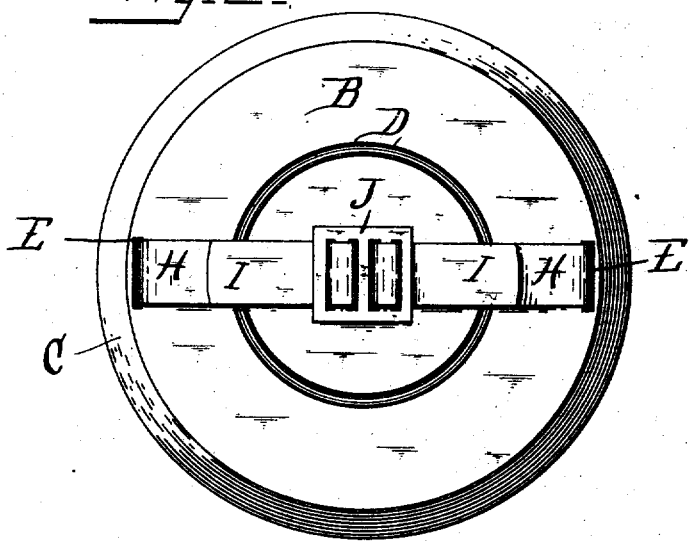

Figure 1 is a front elevation of the device for suspending hats as it appears on a vertical stand, of which the lower part is shown broken. Fig. 2 is a plan view of the same.

Similar letters refer to similar parts throughout the two views.

A indicates a vertical stand suitable to support and illustrate my invention.

B is the circular metallic plate resting upon the aforesaid stand. A flange C and one or more circular indentations D strengthen the thin metallic plate, while the flange also serves the additional purpose of enabling the hat to be slipped down over the plate, even though the plate is nearly the size of the hat, owing to the fact that the flange flares outwardly from the disk. The two elongated slots E through the surface of the plate in close proximity to the flange and diametrically opposite to each other are to allow the bands H to pass through. The ends I of bands meet over the plate and pass through a buckle J, by means of which the bands can be lengthened or shortened to suit the purposes intended. The outer or suspended ends K of bands are supplied with clips *n*, which are capable of attachment to the inner or sweat bands of men's hats, thus suspending the hat on a show-frame without interfering in any way with the shape of crown of hat.

This device is easily attached or unattached to hats on view on hat-supports and so perfectly prevents the hats from assuming any improper or incongruous imperfections by the fact that the hat is suspended by means of the inner or sweat band.

The under side of plate B or its grooves D rests upon the standard A, the upper part of which may be made either round or square or, in fact, any convenient shape, so as to enter the device in the inner side of flange C, as shown in broken lines. The indentations or grooves in upper part of said plate are merely to strengthen the same on account of its thinness, as before mentioned.

What I claim as my invention, and desire to secure by Letters Patent, is—

1. A hat support consisting of a standard, a disk secured to the top thereof, two flexible bands adjustably suspended therefrom at their upper ends, and each having a clamp suspended from its lower end, whereby the clamps are enabled to engage with the sweat band of the hat and loosely hold it away from the support at all points, substantially as set forth.

2. A hat support consisting of a standard, a disk secured to the top thereof, said disk being provided with a flange and having perforations through it adjacent the flange and upon opposite sides of the disk, a band through each of the perforations in the disk, the lower end of each of which is provided with a clamp, and means for adjustably securing the upper ends of said bands together above the disk, substantially as set forth.

3. In a device for suspending hats, the thin circular metallic plate B, with flange C and one or more circular indentations D and elongated slots E, diametrically opposite to each other, in combination with the suspension-bands H, with buckle J for lengthening or shortening purposes, and clips *n* to attach to the inner or sweat band of hats, substantially as specified and set forth.

WILLIAM APPLEGATH.

Witnesses:
G. G. HACKER,
HORACE C. PRITCHARD.